United States Patent
Gauthier, Jr. et al.

(10) Patent No.: US 7,435,010 B2
(45) Date of Patent: Oct. 14, 2008

(54) HIGH TEMPERATURE LIGHT GUIDE

(75) Inventors: Leo R. Gauthier, Jr., Ellicott City, MD (US); James E. McDonald, Monson, MA (US); Louis A. Mattes, Glen Burnie, MD (US)

(73) Assignee: The Johns Hopkins University, Baltimore, MD (US)

( * ) Notice: Subject to any disclaimer, the term of this patent is extended or adjusted under 35 U.S.C. 154(b) by 33 days.

(21) Appl. No.: 11/619,449

(22) Filed: Jan. 3, 2007

(65) Prior Publication Data

US 2008/0002935 A1    Jan. 3, 2008

Related U.S. Application Data

(63) Continuation-in-part of application No. 10/829,070, filed on Apr. 21, 2004, now Pat. No. 7,156,559.

(60) Provisional application No. 60/464,271, filed on Apr. 21, 2003.

(51) Int. Cl.
*G02B 6/40* (2006.01)
*G02B 6/00* (2006.01)

(52) U.S. Cl. ............................. 385/54; 385/12; 385/53; 385/115; 385/147; 356/43; 356/44; 356/45; 356/241.1; 250/227.28; 250/227.2

(58) Field of Classification Search .................. 385/54, 385/135
See application file for complete search history.

(56) References Cited

U.S. PATENT DOCUMENTS

| 4,657,386 | A | * | 4/1987 | Suarez-Gonzalez et al. ... 356/45 |
| 5,828,797 | A | * | 10/1998 | Minott et al. .................. 385/12 |
| 6,649,924 | B1 | * | 11/2003 | Philipp et al. ............... 250/554 |
| 7,156,559 | B2 | * | 1/2007 | Gauthier et al. ............... 385/54 |

* cited by examiner

*Primary Examiner*—Frank G Font
*Assistant Examiner*—Erin D Chiem
(74) *Attorney, Agent, or Firm*—Aisha Ahmad

(57) ABSTRACT

Disclosed is a method of forming an optical monitoring or transmitting light guide and a resulting apparatus that begins by bonding a bundle of optical fibers together using an epoxy and polishing the distal end of the bundle of optical fibers to create an optical aperture. The ratio of fiber size to binder particulate size of the epoxy used in the bonding process is sufficient to maintain the integrity of the bundle of optical fibers during the polishing of the distal end. The method positions the bundle of optical fibers into a protective sheath and a connector. The coefficient of thermal expansion of the epoxy used in the bonding process matches that of the connector. Once assembled, the invention positions the connector through the opening in the surface of a device, such that the distal end of the bundle of optical fibers is either recessed in, substantially flush with, or extends from the surface of the device through which the connector extends, depending on field-of-view requirements.

13 Claims, 7 Drawing Sheets

HIGH TEMPERATURE LIGHT GUIDE

CROSS-REFERENCE TO RELATED APPLICATIONS

This application claims the benefit of prior filed U.S. provisional application No. 60/464,271 filed on Apr. 21, 2003 and the same is incorporated fully herein by reference.

STATEMENT OF GOVERNMENTAL INTEREST

This invention was made with government support under contract number N00024-98-D-8124 awarded by the U.S. Navy. The government has certain rights in this invention.

BACKGROUND OF THE INVENTION

1. Field of the Invention

The invention generally relates to fiber-optics and more particularly to a fiber optic light guide apparatus that is useful in high-temperature hostile environments.

2. Description of the Related Art

It is often desirable to record illumination conditions and/or images within high-temperature, hostile environments. For example, it is often desirable to be able to view the internal operation of high temperature machinery such as a furnace, engine cylinder, etc. when evaluating the machinery performance. Similarly, as described in "Blast Instrumentation for Lethality Assessment (Johns Hopkins APL Technical Digest, Volume 22, No. 3 (2001) page 355-366, incorporated herein by reference as background) it is desirable to observe the difference between the time of first light compared with the time of first fragment impact during testing of ballistic missiles. Similarly, it is often desirable to transmit information optically through a high-temperature interface.

However, conventional light guides are not suitable for such high-temperature and hostile environments. To the contrary, conventional light guides will become destroyed (e.g., melt, suffer fiber separation, etc.) when placed in high-temperature and/or hostile environments and are therefore incapable of withstanding such high-temperature hostile environments. The invention described below provides a light guide that is useful in such high-temperature and hostile environments.

SUMMARY OF THE INVENTION

The invention forms an optical monitoring or transmitting light guide apparatus by bonding a bundle of optical fibers together using an epoxy and positioning the bundle of optical fibers into a protective sheath and a connector. The connector is positioned at one end of the protective sheath.

To allow use in high-temperature environments, the invention includes a high temperature fiber, such as borosilicate glass (BSG), quartz, or other similar materials. Further, the invention uses a high-temperature epoxy. To prevent the fibers from separating, to provide an environmental seal of the interstitial spaces between fibers, and to keep the fibers fixed relative to each other at high temperatures, the coefficient of thermal expansion of the epoxy used in the bonding process matches that of the connector. The protective sheath and connector are also made of high temperature materials.

The distal end of the bundle of optical fibers is polished to create an optical aperture. The distal end of the bundle of optical fibers is positioned at the end of the connector. In order to allow such high-temperature fibers and epoxy to be polished, without causing separation and fracturing of the fibers, the ratio of fiber size to binder particulate size of the epoxy used in the bonding process is sufficient to maintain the integrity of the bundle of optical fibers during the polishing of the distal end. More specifically, the ratio of fiber size to the binder particulate size of the epoxy used in the bonding process is above 25, and is typically between approximately 25 and 50. Ratios above 50 will also work.

The connector is extended through an opening in the surface of a device, such that the distal end of the bundle of optical fibers can be either recessed in, substantially flush (planar) with, or extend outward from the surface of the device through which the connector extends. The connector can include a fastener, such as a threaded jam nut, clip, etc. that is adapted to engage corresponding threads, clips, etc. in the opening of the device. The connector can also include a seal on the connector to seal the opening of the device, making the exterior of the device gas and liquid tight.

The optical monitoring or transmitting system used by the invention includes a central processing unit and at least one of the aforementioned optical monitoring or transmitting light guides connected to the central processing unit. Again, the connector extends through an opening in the surface of a device. A second connector is positioned at a second end of the protective sheath that is opposite the first end of the protective sheath where the optical monitoring or transmitting light guide connector is positioned. The second connector connects the second end of the light guide to the central processing unit.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
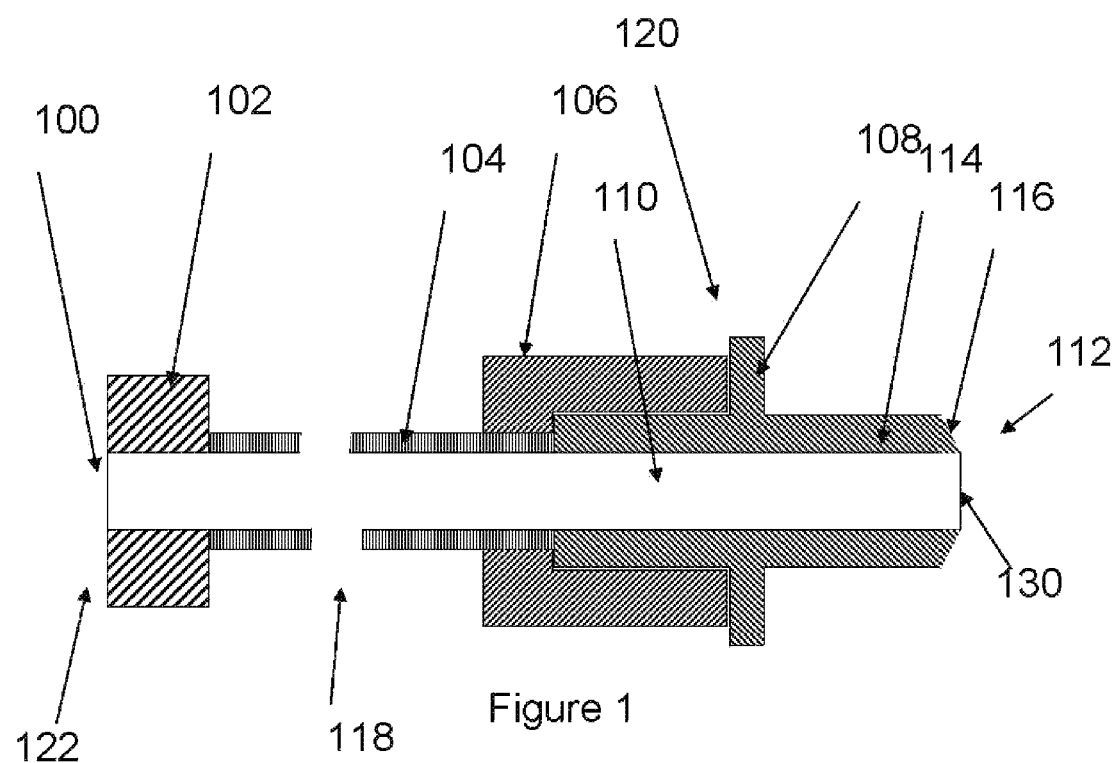
FIG. 1 is a cross-sectional schematic diagram of the inventive light guide.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention.

As mentioned above, it is often desirable to record illumination conditions and/or images within high-temperature, hostile environments. However, conventional light guides are not suitable for such high-temperature and hostile environments. For purposes of this disclosure, high temperatures are in the range of 1,200° F. to 2,000° F. and hostile environments include those that have characteristics such as high pressure, high vacuum, or those that are caustic, abrasive, etc. For example, high-temperature means up to 1200° F. for borosilicate light-guides (high NA range from 0.66 to 0.88), and up to 2000° F. for quartz light-guides (NA=0.22). There is no lower temperature bound, since the invention will also work at lower temperatures. To the contrary, conventional light guides will become destroyed (e.g., melt, suffer fiber separation, etc.) when placed in high-temperature and/or hostile environments and are, therefore, incapable of withstanding such high-temperature hostile environments.

Therefore, the invention provides a light guide that has a high temperature fiber, such as borosilicate glass (BSG), quartz, or other similar materials. Further, the invention uses a special high-temperature epoxy (adhesive, etc.) has the characteristics that are described below, or other similar materials. Conventional high-temperature fibers and epoxies could not be used because of the unusual mechanical stresses that developed during polishing between conventional high-temperature fibers and conventional high-temperature epoxies. To prevent the fibers from separating, and to keep the fibers fixed relative to each other at high temperatures, the coefficient of thermal expansion of the epoxy used in the bonding process matches that of the connector. The protective sheath and connector are also made of high temperature materials, such as stainless steel, polymide etc.

Figure 2:
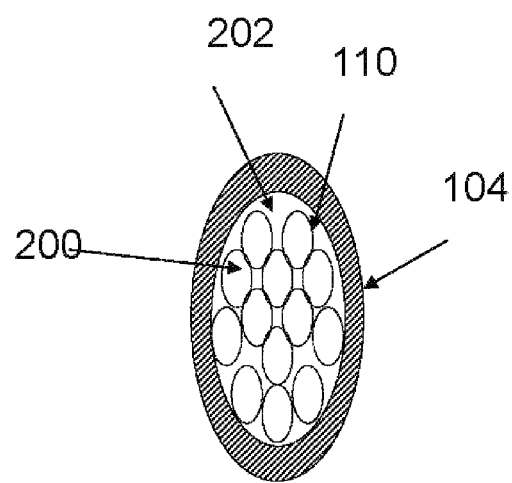
FIG. 2 is a cross-sectional schematic diagram of the fiber bundle within the inventive light guide.

More specifically, as shown in FIGS. 1 and 2, the invention forms an optical monitoring or transmitting light guide apparatus by bonding a bundle 110 of optical fibers 200 together using an epoxy 202. The bundle of optical fibers 110 is positioned within a protective sheath 104, a distal connector 120, and a proximate connector 122. The distal connector 120 is designed to properly operate at high temperatures.

Some possible materials for the protective sheath 104 include any type of high-temperature polyimide, stainless steel, and/or silicone rubber. Alternatively, a "vanguard layer" made of polyimide with a silicone rubber outer later for kink resistance can be used in addition to or in place of the protective sheath 104. The vanguard layer is a higher temperature tougher material that does the most to protect the fibers, hence the use of the term vanguard. The protective sheath 104 and optical fibers 200 could be any length (e.g., 10+ meters) as indicated by the break 118 in the drawing. The connector 120 is positioned at one end of the protective sheath 104 and includes a fastener 106 and a protective tube 114. The protective tube 114 includes a shoulder 108 and a tapered or rounded end 116, as well as an opening 112 for the optical fiber bundle 110. The protective tube 114 can be made of any high temperature material including stainless steel, etc. The end 130 of the optical fiber bundle 110 is typically flush with the end 116 of the protective tube 114. Alternatively, the distal tip could be polished to any desirable shape to accommodate alternative fields-of-view. At the other end of the protective sheath 104 is a second connector 122 (e.g., standard SMA) having a connector body 102 and an opening 100 through which the bundle of optical fibers 110 can pass and be visible.

The high-temperature characteristics of the inventive device are not necessarily maintained over the whole light-guide assembly. The protective sheath 104 maintains proper characteristics up to about 800° F., while silicone rubber maintains proper characteristics up to 450° F. The high-temperature focus of 1200-2000° F. is concentrated at the distal tip of connector 120.

The distal end 130 of the bundle of optical fibers 110 is polished to create an optical aperture. This polishing process is controlled to make any range of wide-angle or narrow-angle aperture, depending upon the specific application of the light guide. A bevel, facet or spherical radius may be polished onto the surface of the fiber to steer or shape the light gathering capabilities in a specific direction.

Conventional devices could not use such high-temperature fibers and epoxies because they were difficult to polish without damaging the optics, which unacceptably reduced yield. In order to allow such high-temperature fibers 200 and epoxy 202 to be polished, without causing separation and fracturing of the fibers 200, the inventors used a specially modified non-standard high-temperature fiber optic epoxy filler that has very small binder particulates to provide a ratio of fiber size to binder particulate size (filler size, grit size, etc.) of the epoxy 202 used in the bonding process that is sufficient to maintain the integrity of the bundle of optical fibers 110 during the polishing of the distal end 130. Polishing the fibers provides a uniform planar surface from fiber to fiber and optimizes the light gathering capability of the fibers. Conventional fiber optic epoxies uses binder particulates that are too large (relative to fiber strand size) to fill the inter-fiber spaces and the polishing/grinding results in fractured fibers. Therefore, the invention uses a new fiber optic epoxy that has a binder particulate size that is substantially smaller than conventional fiber optic epoxies. More specifically, the ratio of fiber size to binder particulate size of the epoxy 202 used in the bonding process is above 25, and is typically as high as 50 (a higher ratio represents a smaller epoxy binder particulate size) Ratios greater than 50 will also work, but could require additional processing steps depending on the size of the fibers. For example, if the individual fiber size is 50 micrometers in diameter, the invention would use an epoxy 202 binder particulate size of between 1 and 2 micrometers, thereby producing a fiber size to binder particulate size ratio of between 25 and 50.

In addition, because of the unusually small epoxy binder particulate size used in the invention, a new technique for applying the epoxy to the optic fibers was developed. More specifically, with the invention, the epoxy 202 is injected between the optic fibers 200 using a syringe or similar injection apparatus to ensure that the epoxy is fully positioned between all optic fibers. This is contrary to the conventional application methodologies which use a spatula or calking gun to apply the larger particulate epoxies.

Figure 3:
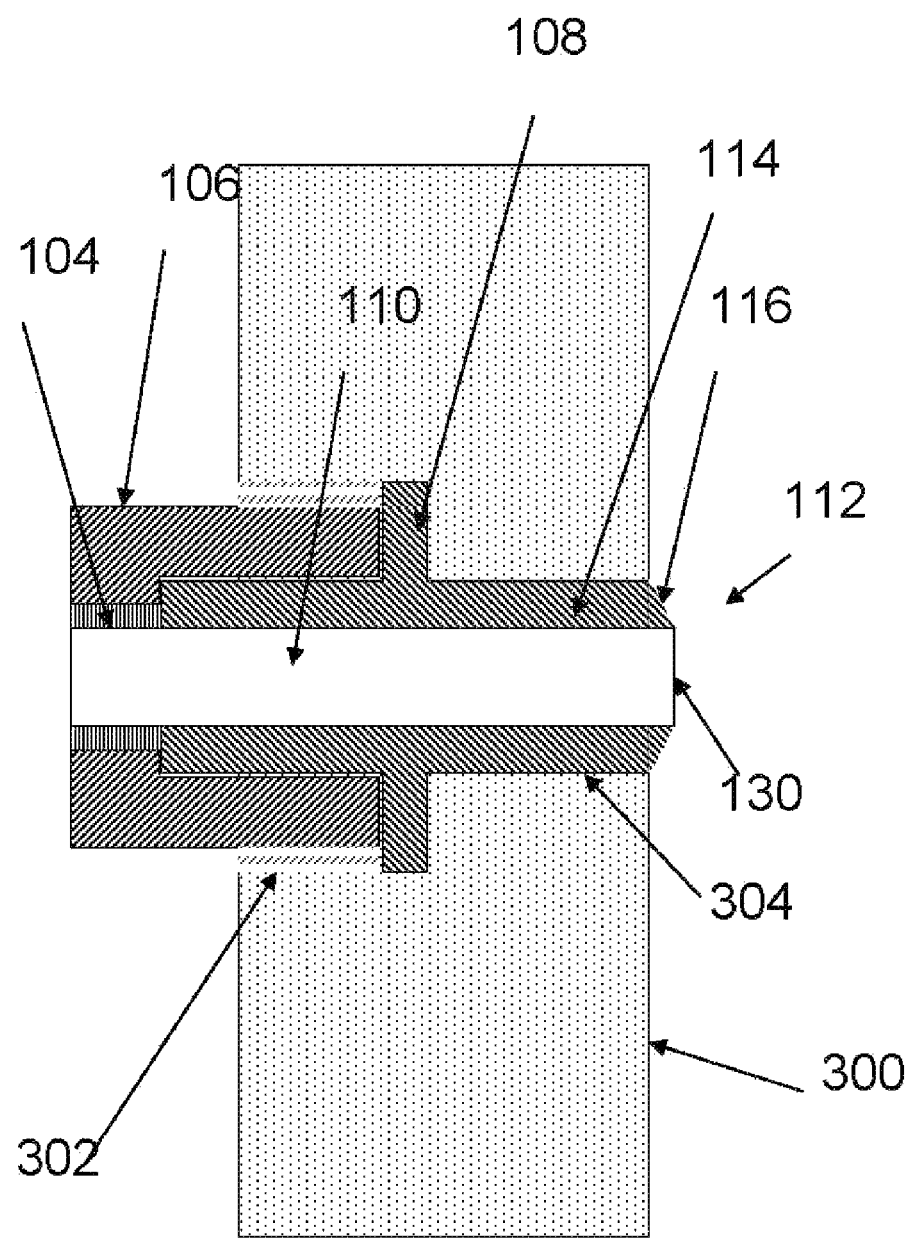
FIG. 3 is a cross-sectional schematic diagram of the inventive light guide.
Figure 4:
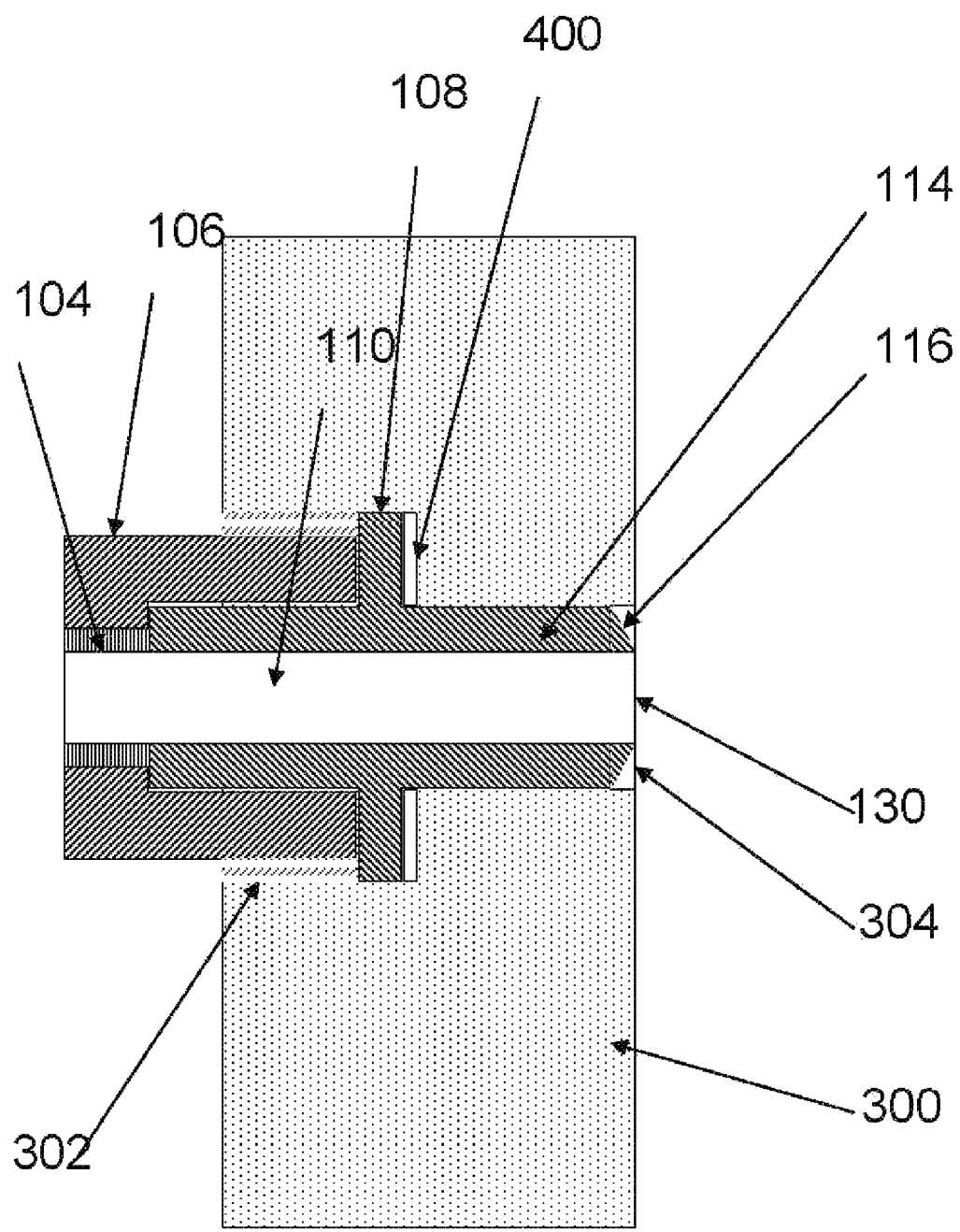
FIG. 4 is a cross-sectional schematic diagram of the inventive light guide.
Figure 5:
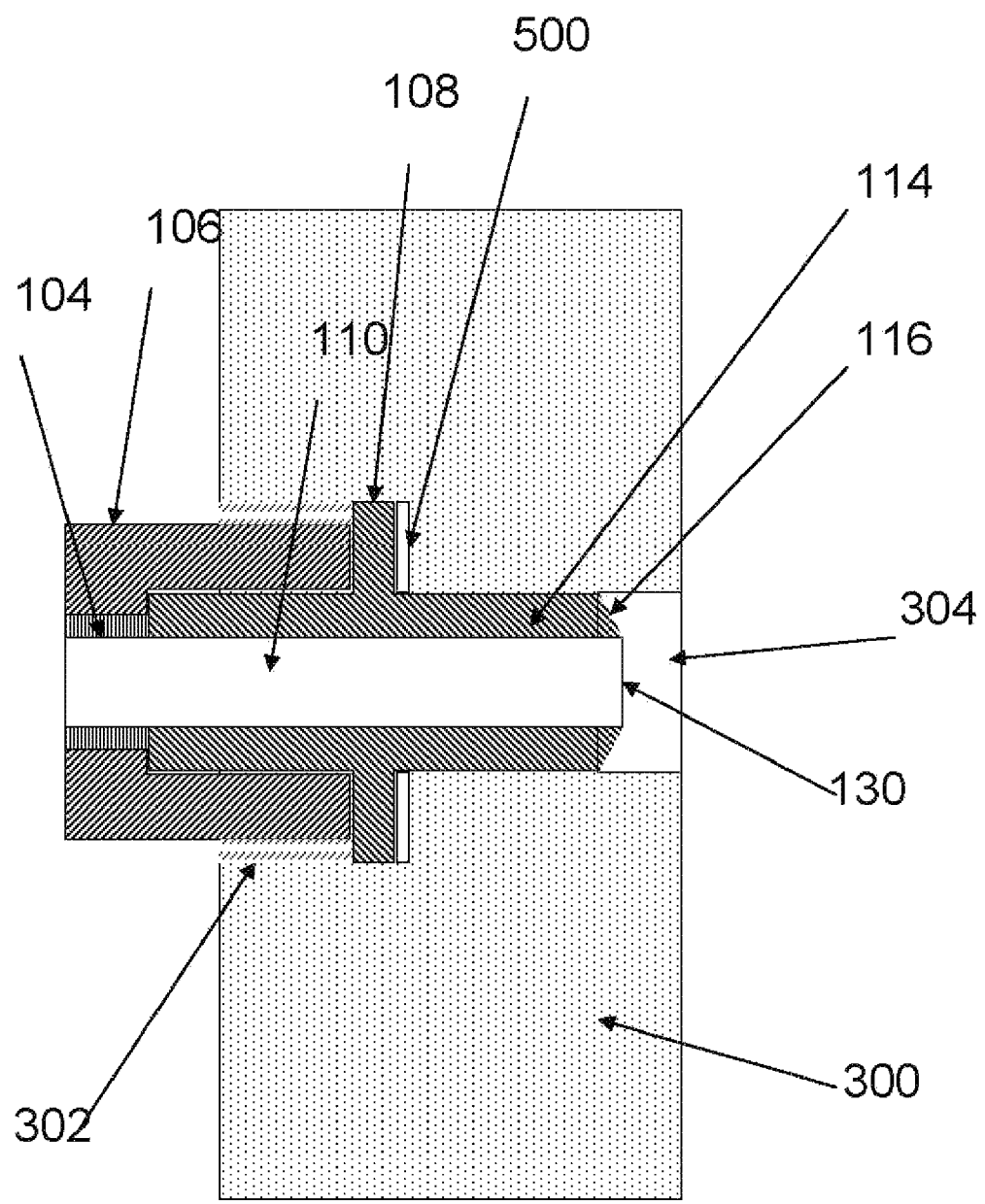
FIG. 5 is a cross-sectional schematic diagram of the inventive light guide.

As shown in FIGS. 3-5, the connector 120 is extended through an opening 304 in a surface 300 of a device, such that the distal end 130 of the bundle of optical fibers 110 can either extend outward from (FIG. 3), be substantially flush with (FIG. 4), or be recessed in (FIG. 5) the outer surface 300 of the device through which the connector 120 extends. The "device" surface 300 shown in cross-section in FIGS. 3-5 could be the wall of any apparatus, such as the cylinder wall of an internal combustion engine, the wall of a furnace, the outer surface of a ballistic missile, etc. The opening 304 in the device comprises a stepped opening that accommodates (matches the shape of) the step created by the shoulder 108.

The invention can optionally use shims 400 (washers, etc.) between the shoulder 108 and the step in the opening 304 to adjust the position of the distal end 130 within the opening 304. Alternatively, the connector 120 is designed to have a length to allow it to have the desired position within the opening 304 of the surface 300. Note that the opening 304 in the surface 300 could be formed to match the shape of the shoulder 108 to assist with proper positioning.

The connector can include a threaded jam nut, clip, etc. (fastener) 106 that is adapted to engage corresponding threads, clips, etc. 302 in the opening 304 of the device. In one embodiment, the threads, clips, etc. would be patterned on part of the shoulder 108 to allow them to engage corresponding threads, clips, etc. 302 in the opening 304. Alternatively, the fastener 106 could include self-tapping threads, or could be affixed within the opening 304 using a chemical fastener (e.g., high-temperature glue, epoxy, weld, etc.) 302. The connector 120 can also include a seal 500 (at shoulder 108) to seal the opening 304 of the device, making the exterior of the device gas and/or liquid tight.

Figure 6:
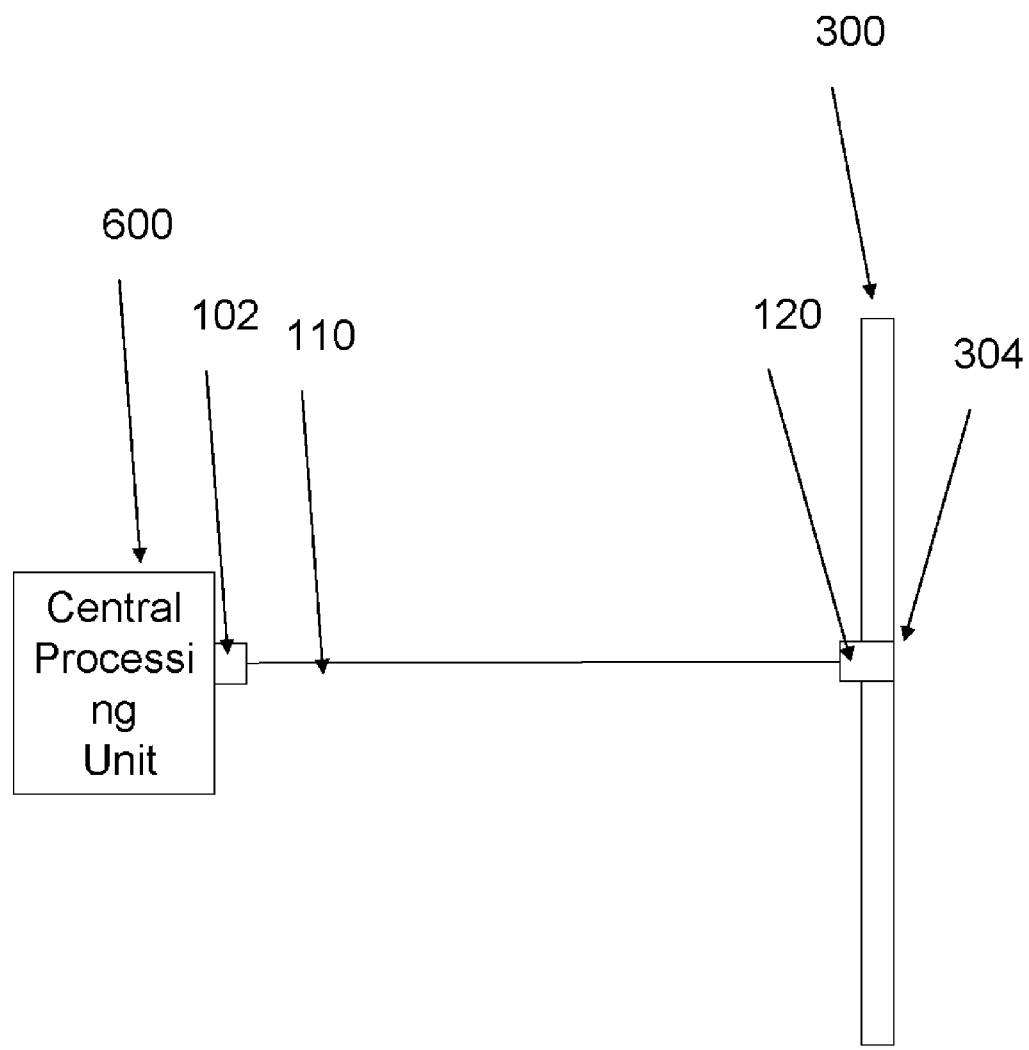
FIG. 6 is a system diagram of the invention.

The optical monitoring or transmitting system used by the invention shown in FIG. 6 includes a central processing unit/ optic-electrical converter 600 for converting, receiving, recording, processing, and transmitting the light/images transmitted along the light guide 110 and at least one connector 120 that extends through an opening 304 in the surface 300 of the device. The second connector 122 is positioned at a second end of the light guide 110 that is opposite the end where the optical monitoring or transmitting light guide connector 120 is positioned and connects the light guide 110 to the central processing unit 600.

Figure 7:
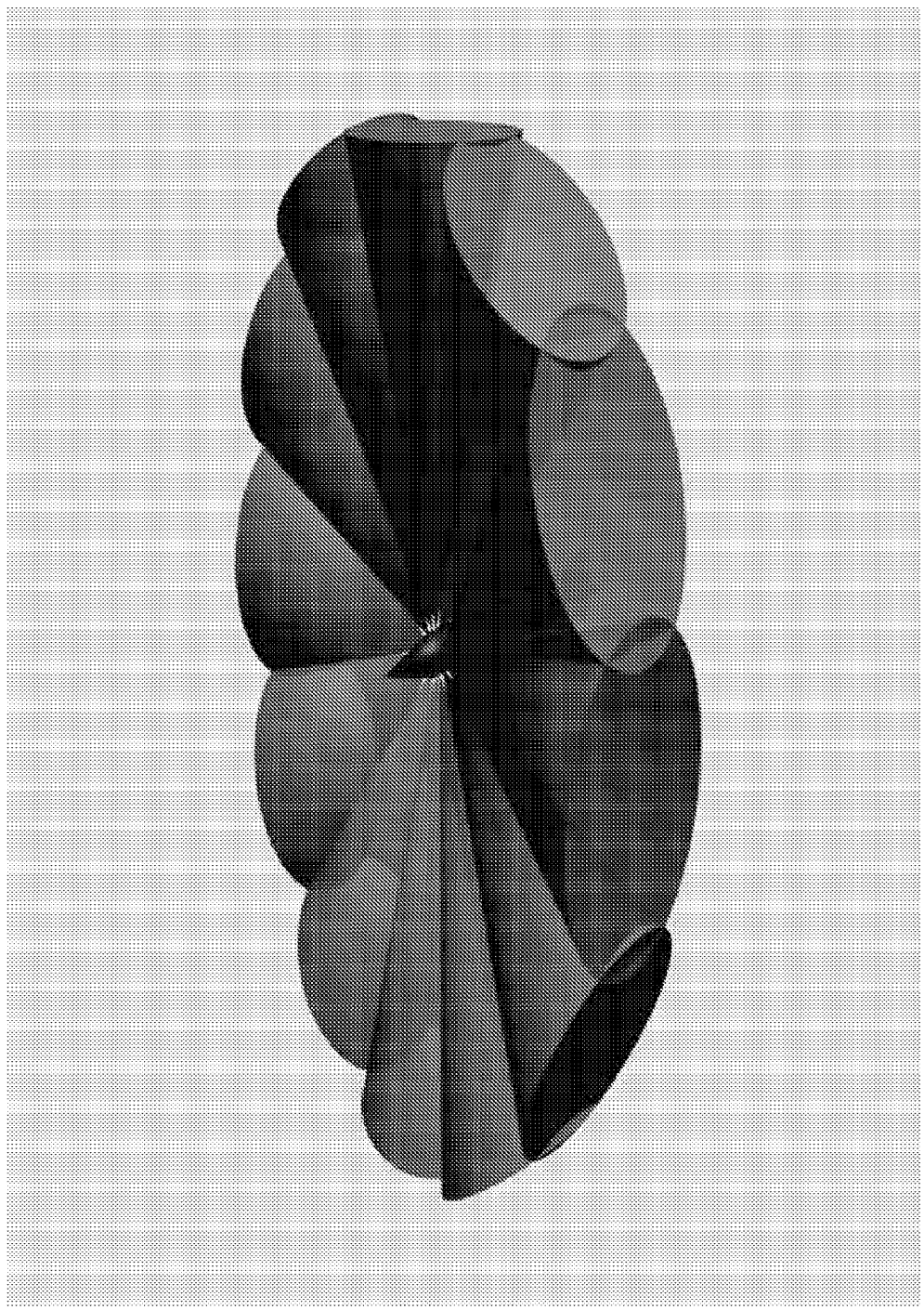
FIG. 7 is the transmission mode of the invention.

FIG. 7 demonstrates one embodiment of the system in transmission mode. The optical beams emitted from the high temperature light guides form a data ring around the vehicle. A 12-cone ring arrangement is shown wherein cones of emission may be arranged in various ways to create a reception space. Such cones form beams which can extend out as far as kilometers from the emission points. Transmitted data may be sent in parallel or multiplexed mode from one cone or beam to another. Overlapping emission cones can also cover a hemispherical or spherical space. Other vehicles or satellites within the cones can receive data with course (non-demanding) point requirements.

Figure 8:
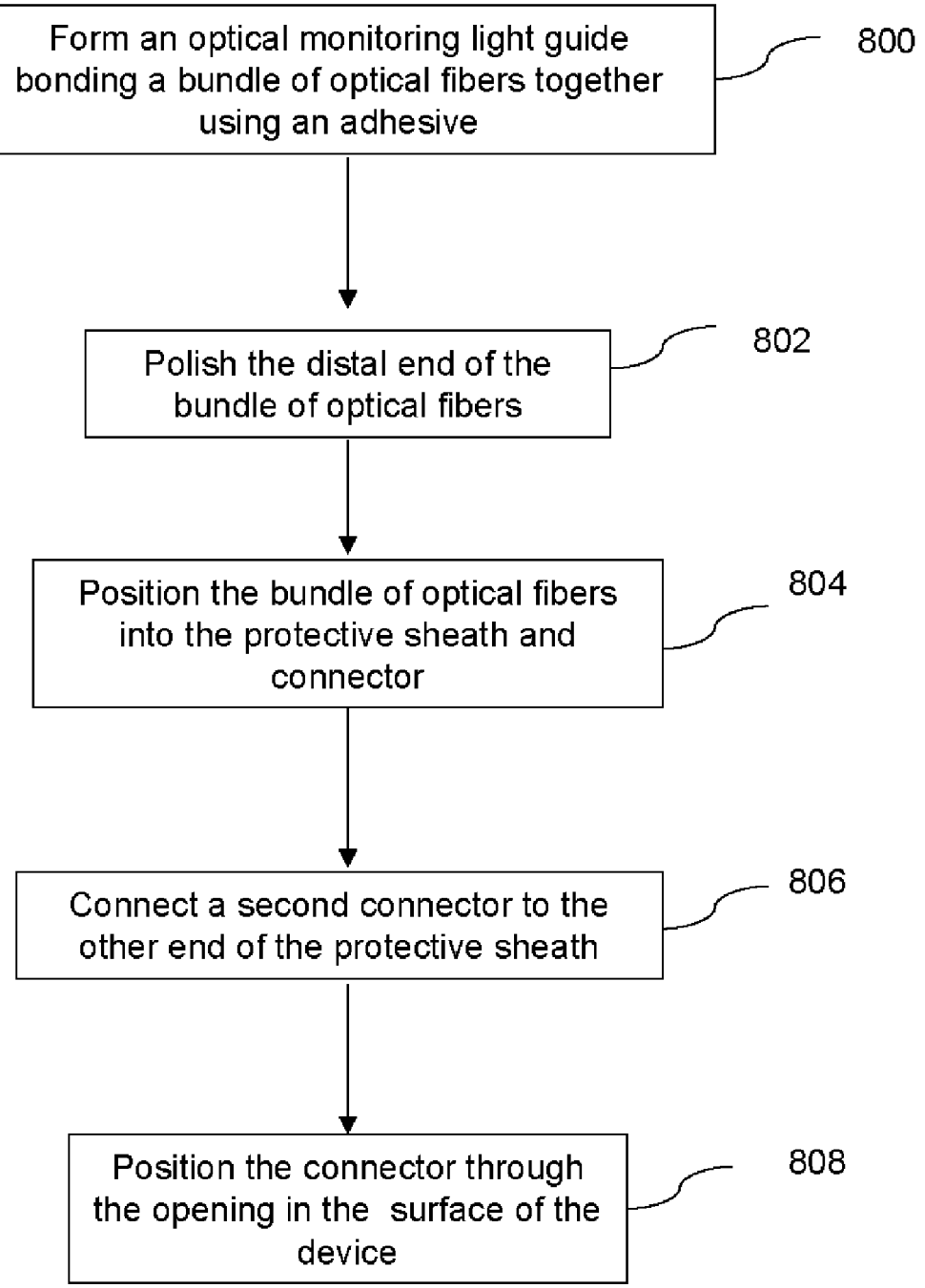
FIG. 8 is a flowchart illustrating the operation of the invention.

FIG. 8 shows the processing of the invention in flowchart form. More specifically, the inventive method of forming an optical monitoring or transmitting light guide begins by bonding a bundle of optical fibers together using an epoxy (adhesive) 800 and polishing the distal end of the bundle of optical fibers 802 to create an optical aperture. Again, the ratio of fiber size to binder particulate size of the epoxy used in the bonding process is sufficient to maintain the integrity of the bundle of optical fibers during the polishing of the distal end.

In item 804, the invention positions the bundle of optical fibers into the protective sheath and connector. Again, the coefficient of thermal expansion of the epoxy used in the bonding process matches that of the connector. A second connector is connected to the other end of the protective sheath 806. Once assembled, the invention positions the connector through the opening in the surface of the device 808, such that the distal end of the bundle of optical fibers is either recessed in, substantially flush with, or extends from the surface of the device through which the connector extends.

Therefore, the invention provides a light guide that has a high temperature fiber held together by a high-temperature epoxy. Conventional high-temperature fibers and epoxies could not be used because of the unusual mechanical stresses that developed during polishing between conventional high-temperature fibers and conventional high-temperature epoxies. To prevent the fibers from separating, and to keep the fibers fixed relative to each other at high temperatures, the coefficient of thermal expansion of the epoxy used in the bonding process matches that of the connector. The protective sheath and connector are also made of high temperature materials, such as stainless steel, polyimide, etc. Conventional devices could not use such high-temperature fibers and epoxies because they were difficult to polish, which unacceptably reduced yield. In order to allow such high-temperature fibers and epoxy to be polished, without causing separation or fracturing of the fibers, the ratio of fiber size to binder particulate size of the epoxy used in the bonding process is sufficient to maintain the integrity of the bundle of optical fibers during the polishing of the distal end. More specifically, the ratio of fiber size to binder particulate size of the epoxy used in the bonding process is above 25, and is between approximately 25 and 50.

The examples used herein are intended merely to facilitate an understanding of ways in which the invention may be practiced and to further enable those of skill in the art to practice the invention. Accordingly, the examples should not be construed as limiting the scope of the invention. For example, while all figures imply normal installation for distal tip, one ordinarily skilled in the art would understand that the connector 120 could be used at any angle as required by field of view requirements. Similarly, while the device described above is one which receives light, as would be understood by those ordinarily skilled in the art, the invention is equally applicable to fiber optic devices that transmit data signals in high-temperature, hostile environments.

While the invention has been described in terms of preferred embodiments, those skilled in the art will recognize that the invention can be practiced with modification within the spirit and scope of the appended claims.

What is claimed is:

1. An optical light guide system comprising:
   a connector;
   a bundle of optical fibers positioned within said connector;
   an epoxy joining said optical fibers together, wherein said bundle of optical fibers has a polished distal end that transmits optical signals at one end of said connector, wherein the ratio of fiber size to binder particulate size of said epoxy is sufficient to maintain the integrity of said bundle of optical fibers during polishing of said distal end, and wherein the ratio of the fiber size to the binder particulate size of said epoxy is between approximately 25 and 50;
   an optical light guide transmitter located at the polished distal end of said bundle of optical fibers, said optical light guide transmitter operable to transmit optical beams in a high temperature environment up to about 2000 degrees Fahrenheit; and
   an optical light guide receiver operable to receive the optical beams:
   wherein the optical beams form a data ring of transmission around said transmitter, the data ring comprises at least one of a plurality of emission cones, said transmitter operable to transmit up to kilometers from said transmitter.

2. A system as claimed in claim 1, wherein said optical light guide transmitter is operable to transmit in parallel or multiplex signal processing mode.

3. A system as claimed in claim 1, wherein said bundle of optical fibers comprises borosilicate glass.

4. A system as claimed in claim 1, wherein said bundle of optical fibers comprises quartz.

5. A system as claimed in claim 1, wherein said plurality of emission cones includes up to 12 cones to create a reception space.

6. A system as claimed in claim 1, wherein said optical light guide transmitter operable to transmit the optical beam in a high temperature environment between 1200 degrees and 2000 degrees Fahrenheit.

7. A method of forming an optical light guide system, said method comprising:
bonding a bundle of optical fibers together using an epoxy;
polishing a distal end of said bundle of optical fibers to create an optical aperture, wherein the ratio of fiber size to binder particulate size of said epoxy used in said bonding process is sufficient to maintain the integrity of said bundle of optical fibers during said polishing of said distal end;
positioning said bundle of optical fibers into a protective sheath and a connector, wherein said connector is positioned at one end of said protective sheath, wherein said distal end of said bundle of optical fibers is positioned at an end of said connector, and wherein the ratio of fiber size to binder particulate size of said epoxy used in said bonding process is between approximately 25 and 50;
transmitting via a transmitter coupled to said distal end of said bundle of optical fibers, the transmitter operable to transmit a communication link in a high temperature environment of up to about 2000 degrees Fahrenheit; and
wherein the optical beams form a data ring of transmission around said transmitter, the data ring comprises at least one of a plurality of emission cones, said transmitter operable to transmit up to several kilometers from said transmitter.

8. A method as claimed in claim 7, wherein said plurality of emission cones includes overlapping emission cones capable of covering at least a hemispherical reception space.

9. A method as claimed in claim 7, wherein said plurality of emission cones includes overlapping emission cones capable of covering a spherical reception space.

10. A method as claimed in claim 7, wherein said optical light guide transmitter operable to transmit in parallel or multiplex signal processing mode.

11. A method as claimed in claim 7, wherein said bundle of optical fibers comprises borosilicate glass.

12. A method as claimed in claim 7, wherein said bundle of optical fibers comprises quartz.

13. A method as claimed in claim 7, wherein said plurality of emission cones includes up to 12 cones of reception space.

* * * * *